(12) United States Patent
Ebnöther et al.

(10) Patent No.: US 10,144,582 B2
(45) Date of Patent: Dec. 4, 2018

(54) CARGO CONTAINER APPARATUS INCLUDING A SANDWICH STRUCTURE AND A TRACK

(71) Applicant: CELLTECH METALS, INC., Oceanside, CA (US)

(72) Inventors: Fabien Ebnöther, Munich (DE); Douglas Cox, Oceanside, CA (US)

(73) Assignee: CellTech Metals, Inc., Oceanside, CA (US)

( * ) Notice: Subject to any disclaimer, the term of this patent is extended or adjusted under 35 U.S.C. 154(b) by 23 days.

(21) Appl. No.: 15/490,279

(22) Filed: Apr. 18, 2017

(65) Prior Publication Data

US 2017/0327310 A1    Nov. 16, 2017

Related U.S. Application Data

(60) Provisional application No. 62/334,643, filed on May 11, 2016.

(51) Int. Cl.

| | | |
|---|---|---|
| *B62D 25/02* | (2006.01) | |
| *B65D 90/02* | (2006.01) | |
| *B60P 7/08* | (2006.01) | |
| *B61D 3/00* | (2006.01) | |
| *B61D 17/08* | (2006.01) | |

(Continued)

(52) U.S. Cl.
CPC .......... *B65D 90/028* (2013.01); *B60P 7/0815* (2013.01); *B61D 3/00* (2013.01); *B61D 17/08* (2013.01); *B62D 33/046* (2013.01); *B65D 88/121* (2013.01); *B65D 90/0053* (2013.01); *B65D 90/022* (2013.01); *B65D 2590/005* (2013.01)

(58) Field of Classification Search
CPC ... B65D 90/028; B65D 88/121; B60P 7/0815; B61D 3/00; B61D 17/08
USPC ...................................................... 296/186.1
See application file for complete search history.

(56) References Cited

U.S. PATENT DOCUMENTS

| | | |
|---|---|---|
| 782,558 A | 2/1905 | Hahn |
| 2,087,010 A | 7/1937 | Wardle |

(Continued)

FOREIGN PATENT DOCUMENTS

| | | |
|---|---|---|
| GB | 2182703 A | 5/1987 |
| WO | WO-2015/148707 A1 | 10/2015 |

OTHER PUBLICATIONS

Kim, Jang-Kyo, et al.; "Forming and failure behaviour of coated, laminated and sandwiched sheet metals: a review", *Journal of Materials Processing Technology*, 63, 1997, pp. 33-42.

(Continued)

*Primary Examiner* — Pinel E Romain
(74) *Attorney, Agent, or Firm* — Harness, Dickey & Pierce, P.L.C.

(57) ABSTRACT

A container apparatus includes a sandwich structure. In another aspect, a cargo-securing or logistics track is attached to a sandwich structure of a container apparatus which employs at least one core sheet including alternating peaks and valleys therein in addition to at least one adhesively bonded outer face sheet. Yet another aspect of a container apparatus includes a depression in a sandwich structure adapted to receive a flush mounted track or post therein. Another aspect of a container apparatus includes a ship-lap and/or bent peripheral flange at a panel-to-panel interface seam.

7 Claims, 4 Drawing Sheets

(51) Int. Cl.
*B65D 88/12* (2006.01)
*B62D 33/04* (2006.01)
*B65D 90/00* (2006.01)

(56) References Cited

U.S. PATENT DOCUMENTS

| | | |
|---|---|---|
| 2,391,997 A | 1/1946 | Noble |
| 2,441,476 A | 5/1948 | Ewald |
| 2,481,046 A | 9/1949 | Scurlock |
| 2,605,064 A | 7/1952 | Davis |
| 2,738,297 A | 3/1956 | Pfisterhammer |
| 2,809,908 A | 10/1957 | French |
| 2,950,788 A | 8/1960 | Edgar |
| 3,013,641 A | 12/1961 | Compton |
| 3,071,853 A | 1/1963 | Price et al. |
| 3,086,899 A | 4/1963 | Smith |
| 3,151,712 A | 10/1964 | Jackson |
| 3,173,383 A | 3/1965 | Eggert |
| 3,217,845 A | 11/1965 | Reynolds |
| 3,227,598 A | 1/1966 | Robb |
| 3,432,859 A | 3/1969 | Jordan |
| 3,481,642 A | 12/1969 | Campbell |
| 3,525,663 A | 8/1970 | Hale |
| 3,597,891 A | 8/1971 | Martin |
| 3,742,663 A | 7/1973 | Duskin |
| 3,757,559 A | 9/1973 | Welsh |
| 3,834,487 A | 9/1974 | Hale |
| 3,865,679 A | 2/1975 | Hale |
| 3,876,492 A | 4/1975 | Schott |
| 3,914,486 A | 10/1975 | Borgford |
| 3,938,963 A | 2/1976 | Hale |
| 3,950,259 A | 4/1976 | Pallo et al. |
| 4,025,996 A | 5/1977 | Saveker |
| 4,044,186 A | 8/1977 | Stangeland |
| 4,049,855 A | 9/1977 | Cogan |
| 4,077,247 A | 3/1978 | Stewart |
| 4,275,663 A | 6/1981 | Sivachenko et al. |
| 4,344,995 A | 8/1982 | Hammer |
| 4,356,678 A | 11/1982 | Andrews et al. |
| 4,411,121 A | 10/1983 | Blacklin et al. |
| 4,635,992 A | 1/1987 | Hamilton et al. |
| 4,718,214 A | 1/1988 | Waggoner |
| 4,910,065 A | 3/1990 | McKinney |
| 5,030,488 A | 7/1991 | Sobolev |
| 5,195,580 A | 3/1993 | Hoeffken |
| 5,366,787 A | 11/1994 | Yasui et al. |
| 5,580,637 A | 12/1996 | Konta et al. |
| 5,678,715 A | 10/1997 | Sjostedt et al. |
| 5,791,118 A | 8/1998 | Jordan |
| 6,183,879 B1 | 2/2001 | Deeley |
| 6,257,043 B1 | 7/2001 | Wiens |
| 6,412,854 B2 | 7/2002 | Ehrlich |
| 6,547,280 B1 | 4/2003 | Ashmead |
| 6,846,559 B2 | 1/2005 | Czaplicki et al. |
| 6,908,143 B2 | 6/2005 | Ashmead |
| 6,928,848 B2 | 8/2005 | Golovashchenko et al. |
| 6,939,599 B2 | 9/2005 | Clark |
| 7,010,897 B1 | 3/2006 | Kuppers |
| 7,025,408 B2 | 4/2006 | Jones et al. |
| 7,100,971 B2 | 9/2006 | Pines |
| 7,214,018 B2 | 5/2007 | Lussier |
| 7,267,393 B2 | 9/2007 | Booher |
| 7,401,844 B2 | 7/2008 | Lemmons |
| 7,527,325 B2 | 5/2009 | Yurgevich |
| 7,621,589 B1 | 11/2009 | Gerome |
| 7,648,058 B2 | 1/2010 | Straza |
| 7,752,729 B2 | 7/2010 | Faehrrolfes et al. |
| 7,753,254 B2 | 7/2010 | Straza |
| 7,757,931 B2 | 7/2010 | Straza |
| 7,798,447 B2 | 9/2010 | Frantz et al. |
| 7,927,708 B2 | 4/2011 | Mizrahi |
| 7,931,328 B2 | 4/2011 | Lewallen et al. |
| 8,016,152 B2 | 9/2011 | Roush et al. |
| 8,205,642 B2 | 6/2012 | Straza |
| 8,419,110 B2 | 4/2013 | Katz et al. |
| 8,426,010 B2 | 4/2013 | Stadthagen-Gonzalez |
| 8,434,472 B2 | 5/2013 | Hanson et al. |
| 8,506,221 B2 | 8/2013 | Pattison et al. |
| 8,580,061 B2 | 11/2013 | Cik |
| 9,067,729 B2 | 6/2015 | Fenton |
| 9,764,780 B2 | 9/2017 | Zehner et al. |
| 9,884,660 B2 | 2/2018 | Fenton |
| 9,884,661 B2 * | 2/2018 | Fenton .................. B62D 25/02 |
| 2003/0210966 A1 | 11/2003 | Haire |
| 2005/0029708 A1 | 2/2005 | Coyle |
| 2005/0084703 A1 | 4/2005 | Ashmead |
| 2009/0159592 A1 | 6/2009 | Vitalis et al. |
| 2012/0234470 A1 | 9/2012 | Nishio et al. |
| 2013/0224419 A1 | 8/2013 | Lee et al. |
| 2015/0165724 A1 | 6/2015 | Cox et al. |

OTHER PUBLICATIONS

Van Straalen, Ijsbrand J.; "Comprehensive Overview of Theories for Sandwich Panels", *TNO Building and Construction Research*, 1998, pp. 48-70.

Stoffer, Harry; "Some suppliers see dollars in a higher CAFE", Automotive News, Crain Communications, Inc., Jul. 2, 2007, two pages.

Carey, John; "What's Next—Green Biz Materials of New Plastics and a Steel Sandwich", BusinessWeek, Oct. 22, 2007, one page.

". . . Honeycomb Structure Holds Potential", Autotech Daily, Apr. 15, 2008, one page.

Vasilash, Gary S.; "From Small Things: Big Differences", Automotive Design and Production, Jun. 2008, one page.

"UltraSteel" brochure published by Hadley Group in Oct. 2010, 8 pages.

Ebnoether, Fabien, et al.; "Predicting ductile fracture of low carbon steel sheets: Stress-based versus mixed stress/strain-based Mohr-Coulomb model;" International Journal of Solids and Structures 50 (2013; published online Dec. 27, 2012); pp. 1055-1066.

Photos of Hyundai "EcoCell" trailer, containing doors including CellTech LLC's three sheet steel sandwich, shown at U.S. tradeshow in Mar. 2013.

"Whiting AirCell Availabity," Whiting airCell promotion, Sep. 26, 2013, three pages.

"airCELL—Innovative Panels for the Truck & Trailer Industries", Whiting, published before Dec. 4, 2013, one page.

"Meyer—Laminating machines for technical textiles, foams, nonwoven, foils, fabrics," http.//www.meyer-machines.com/engl/Products/Laminating/laminating.html, printed from internet, believed to have been published prior to Dec. 13, 2013, one page.

"airCELL The revolutionary all-steel sandwich panel that increases strength and reduces weight for trailer side walls and doors" Whiting, published prior to Nov. 2013, four pages.

* cited by examiner

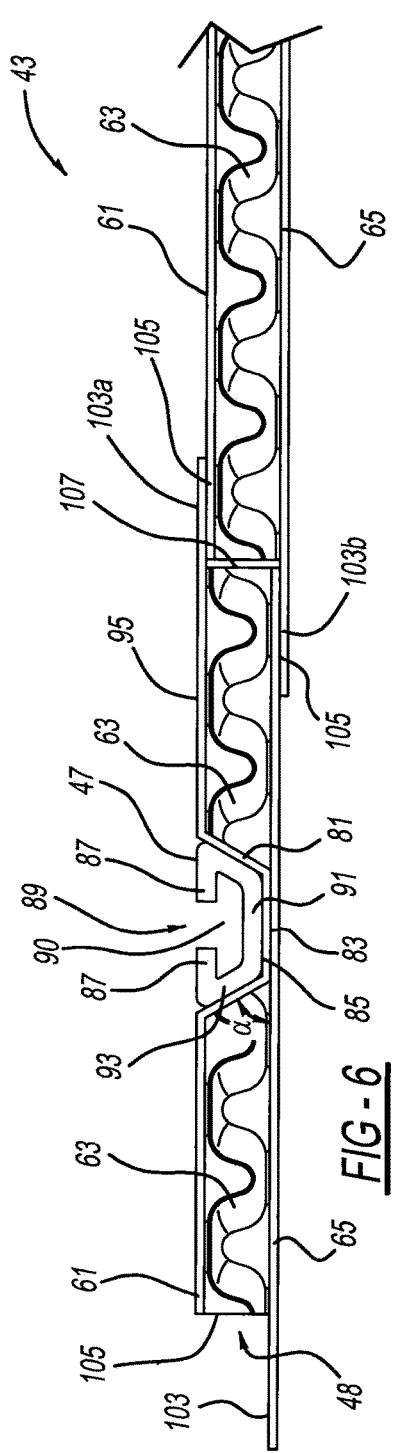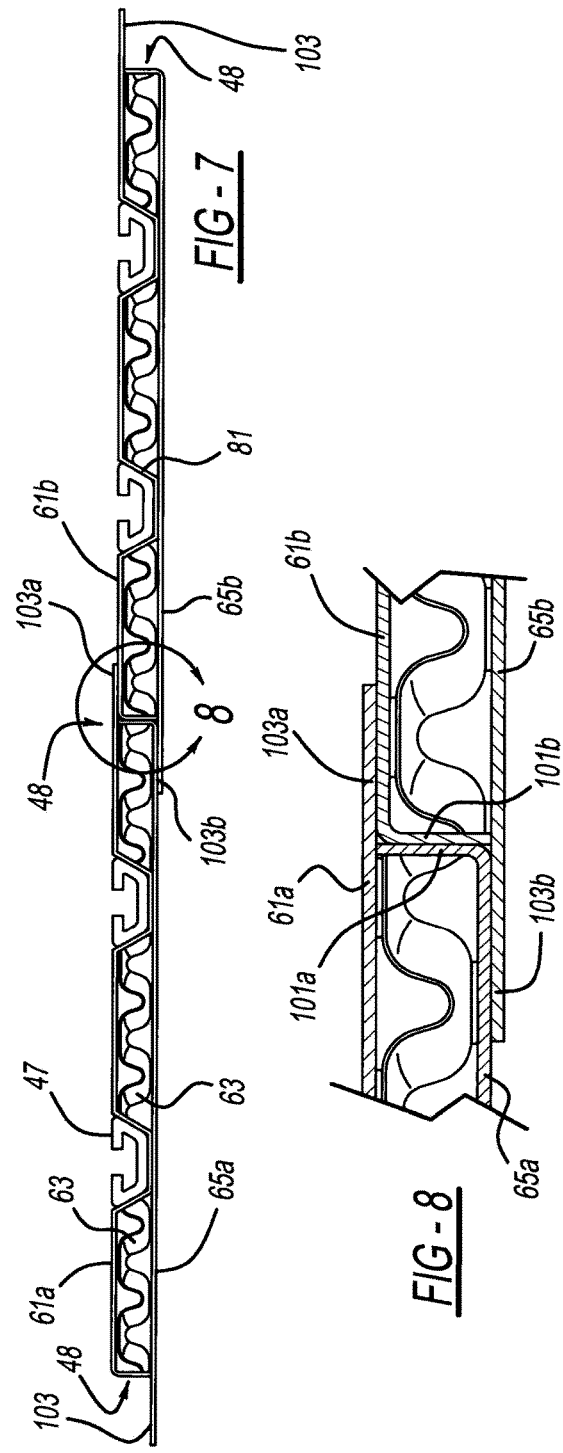

CARGO CONTAINER APPARATUS INCLUDING A SANDWICH STRUCTURE AND A TRACK

CROSS-REFERENCE TO RELATED APPLICATIONS

This application claims priority to U.S. Provisional Patent Application No. 62/334,643, filed on May 11, 2016, which is incorporated by reference herein.

BACKGROUND

The present invention relates generally to containers and more particularly to a cargo container apparatus including a sandwich structure and a track.

It has long been desired in the box trailer industry to have walls and floors made of lightweight and strong panels which are strongly joined together. Most conventional trailer walls and floors, however, require a foam filling, which prevents recycling, and thicker than desired outer sheets of metal, thereby increasing trailer weight which wastes fuel and/or lessens cargo carrying capacity. Furthermore, traditional tracks, posts and joints are heavy, complicated and labor intensive to install. Many also protrude within the cargo space and are prone to snagging by cargo when inserted in the trailer. Exemplary conventional attempts at such a construction are disclosed in the following United States patents and patent publication: U.S. Pat. No. 7,100,971 entitled "Cargo Body with Recessed Posts" which issued to Pines on Sep. 5, 2006; U.S. Pat. No. 8,016,152 entitled "Container Sidewall Connector" which issued to Roush et al. on Sep. 13, 2011; and 2013/0224419 entitled "Composite Panel and Joint Construction" which published to Lee et al. on Aug. 29, 2013. All of these are incorporated by reference herein.

It is noteworthy, however, that these conventional approaches still suffer the same snagging concerns and the panel-to-panel attachments are expensive to manufacture. Furthermore, most traditional devices require additional add-on attachment brackets which span between the adjacent panels; but these configurations typically require juggling of many loose parts, such as rivets, while attempting to align and hold the panels in position, along with undesired extra part handling and weight. The localized attachment points also undesirably concentrate the forces during use thereby creating premature panel fractures at the localized points. Moreover, prior panel-to-panel seams sometimes allow water entry such as in rainy weather which can harm the cargo transported in the container.

SUMMARY

In accordance with the present invention, a container apparatus includes a sandwich structure. In another aspect, a cargo-securing or logistics track is attached to a sandwich structure of a container apparatus which employs at least one core sheet including alternating peaks and valleys therein in addition to at least one adhesively bonded outer face sheet. Yet another aspect of a container apparatus includes a depression in a sandwich structure adapted to receive a flush mounted track or post therein. Another aspect of a container apparatus includes a ship-lap and/or bent peripheral flange at a panel-to-panel interface seam. A joint or connection between adjacent sandwich structures is also provided. Moreover, a further aspect of a container apparatus includes a wheeled box trailer, an intermodal shipping container, a railroad car, or other box-like holding and transporting device.

The present container apparatus, including a cargo-securing or logistics track attached to a sandwich structure, is advantageous over prior constructions. For example, the present apparatus is advantageously lightweight, extremely strong and easy to assemble. The present apparatus provides a flush mounted track and/or close to flush mounted panel-to-panel ship-lap joint thereby make it easier to load and unload cargo in the trailer or container without snags. Furthermore, tracks or posts may be preassembled to an accessible interior face of the present sandwich, in some embodiments, thereby making container assembly easier and stronger while allowing the sandwich to be manufactured and pre-assembled in a site different than a final container assembly site. Additional advantages and features of the present invention can be ascertained from the following description and appended claims, as well as in the accompanying drawings.

BRIEF DESCRIPTION OF THE FIGURES

FIG. 6 is a cross-sectional view, taken along line 6-6 of FIG. 5, showing a track attached to the sandwich structures of the present container apparatus;

FIG. 7 is a cross-sectional view showing another configuration of the tracks and sandwich structures of the present container apparatus; and FIG. 8 is an enlarged cross-sectional view, taken within circle 8 of FIG. 7, showing a ship-lap seam between sandwich structures of the present container apparatus.

DETAILED DESCRIPTION

Figure 1:
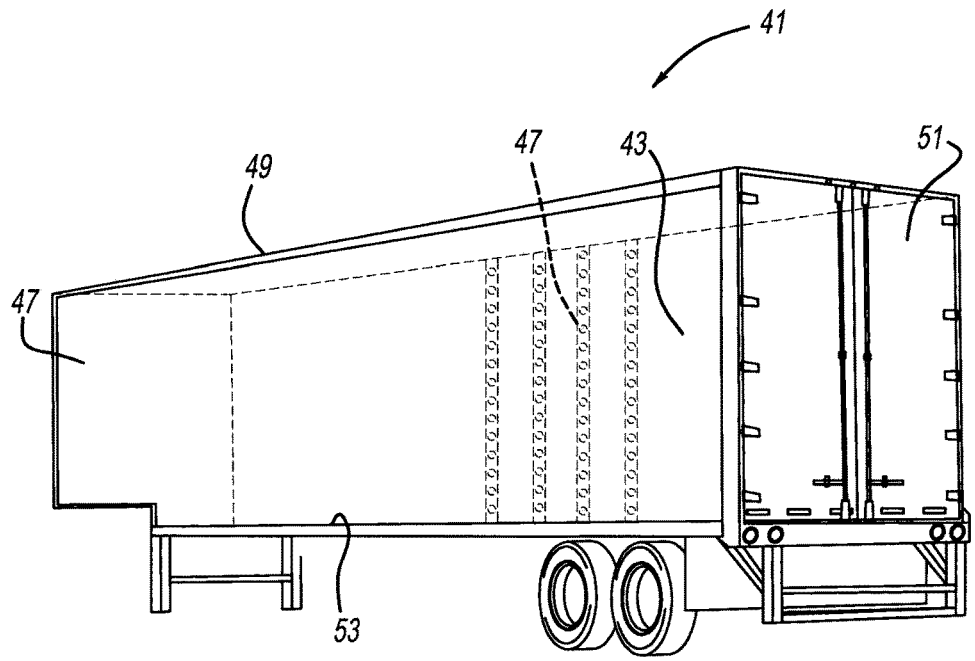
FIG. 1 is a perspective view showing a container apparatus of the present invention employing tracks and sandwich structures.
Figure 5:
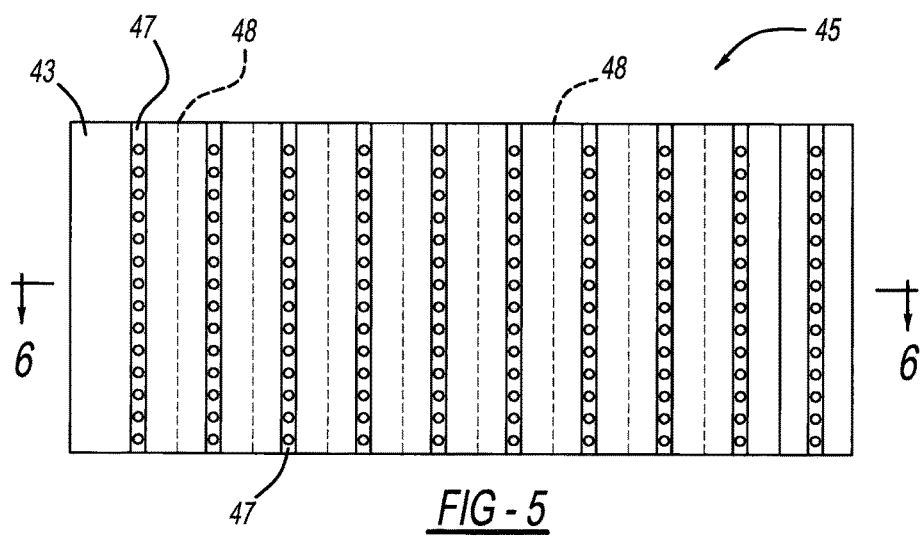
FIG. 5 is a side elevational view, from inside the container apparatus, showing a sidewall of the container apparatus.

FIGS. 1 and 5 illustrate a cargo container apparatus 41, preferably a wheeled box trailer pulled by an automotive tractor or truck, which includes multiple panel sandwich structures 43 therein. Sandwich structures 43 serve as side wall panels 45 to which structural cargo securing or logistics channels or tracks 47 are attached. Sandwich structures 45 can alternately be used as a front wall 47, roof 49 or movable door 51. Moreover, sandwich structures 43 may define a load bearing floor 53 structure upon which wood flooring may optionally be mounted. Unless other specified hereinafter, all of the trailer container constructions disclosed herein are also suitable for defining sections of other transportation containers such as an intermodal shipping container, a railroad car, cargo holding portions of a utility van, decks of a watercraft such as a cargo carrying ship, and the like. An exemplary intermodal shipping container is disclosed in U.S. Pat. No. 5,678,715 entitled "Composite Stacking Frame Assembly for Shipping Container" which issued to Sjostedt et al. on Oct. 21, 1997, and is incorporated by reference herein. Alternately, a post can be attached instead of track 47 and may have a hat section, a Z section, a double hat section, and I-beam or other configurations.

Figure 3:
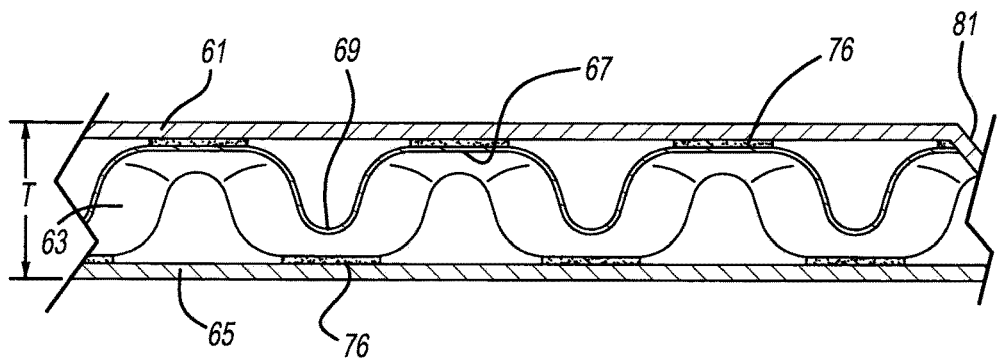
FIG. 3 is a cross-sectional view, taken along line 3-3 of FIG. 2, showing the present sandwich.
Figure 2:
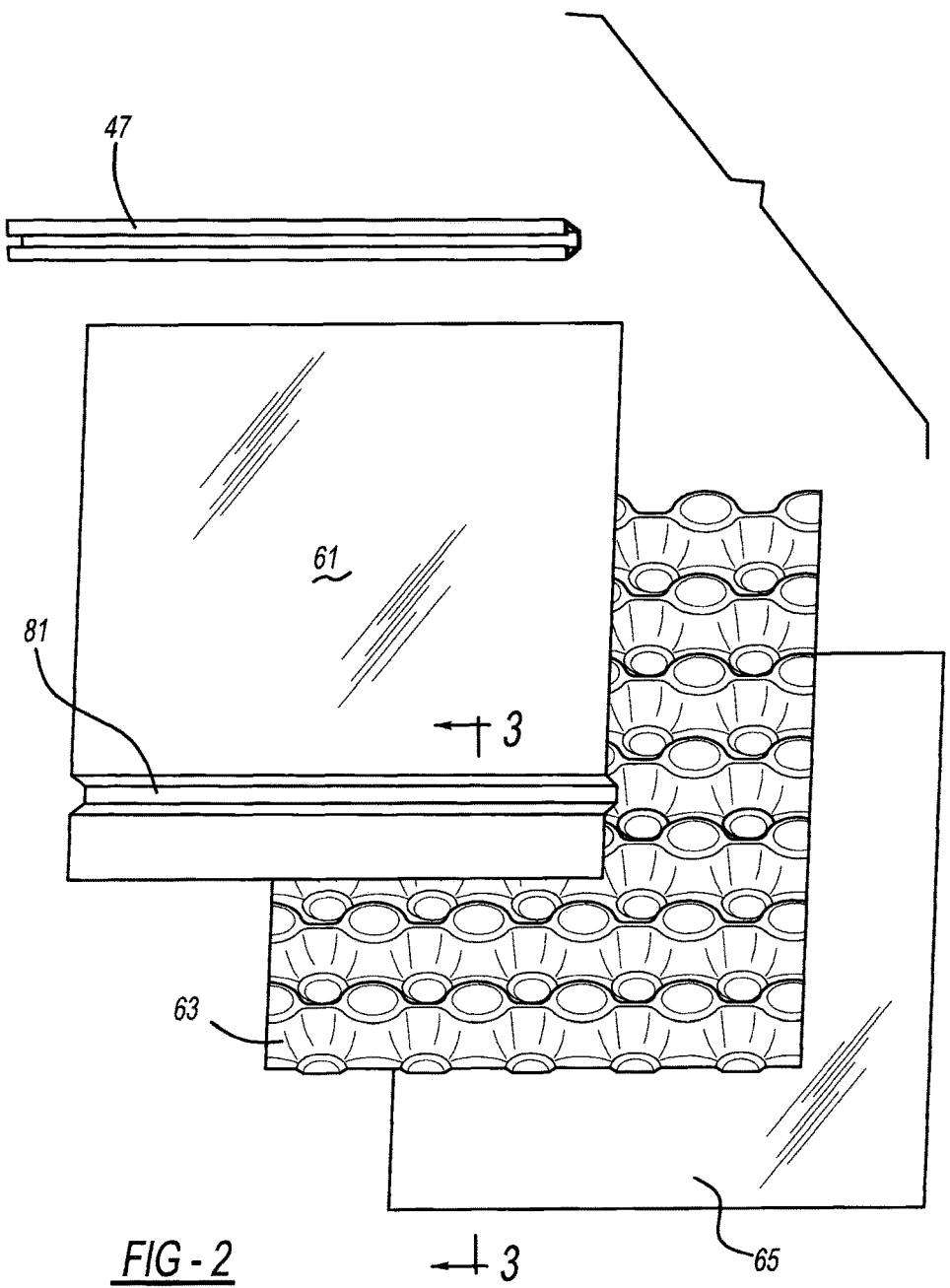
FIG. 2 is an exploded perspective view showing the present sandwich.
Figure 4:
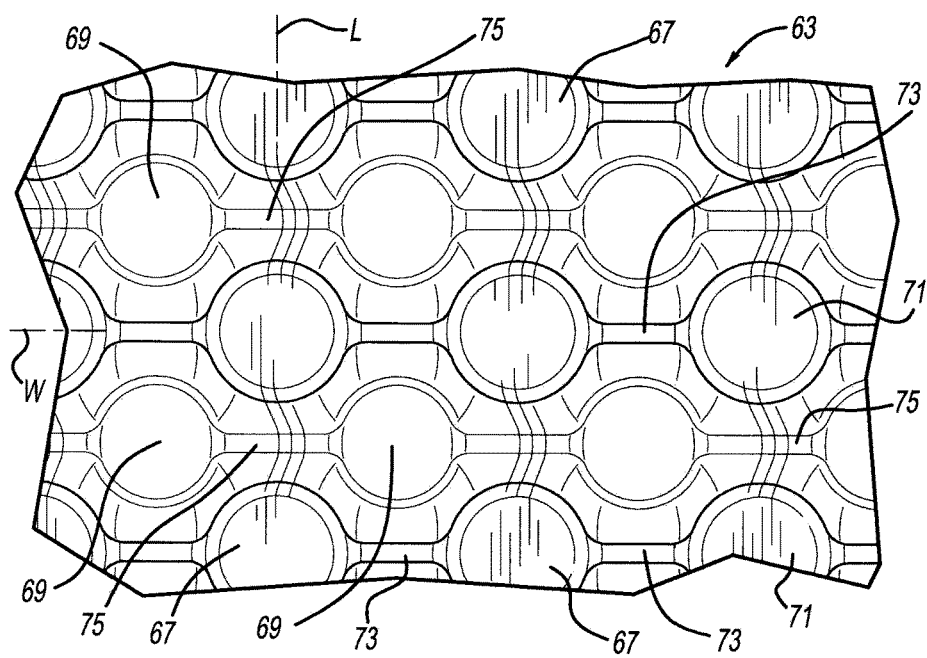
FIG. 4 is a true elevational view showing a formed core sheet employed in the present sandwich.

Sandwich structure 45 can be observed in greater detail in FIGS. 2-4. Sandwich structure 45 includes a first generally flat, inner face sheet 61, a middle core sheet 63 and an opposite generally flat, outer face sheet 65. Furthermore, core sheet 63 includes alternating peaks 67 and valleys 69, the external surface of each being defined by a generally flat land 71. Moreover, raised ridges 73 bridge or span between adjacent peaks 67 along a first width direction W but not in the perpendicular length direction L, where a more abrupt and steeply angled depression 75 is formed. Depressed areas 75 are located between adjacent peaks 67 along second direction L although each depressed area is elongated parallel to ridges 73 since the depressed areas are created on the back side of the ridges when the core sheet is formed into the desired contours from an initially flat workpiece sheet. Each ridge 73 is slightly lower than the generally flat lands 71 of the neighboring peaks 67. Sheets 61, 63 and 65 are preferably metallic, such as low carbon steel or aluminum, but any or all of these sheets may alternately be stainless steel or other metallic materials. The metal grain structure is also different in the roll/feeding direction L of core sheet 63 than in the cross-roll/cross-feeding direction W. The core is preferably formed by embossing rollers.

The placement of ridges 73 and depressed areas 75 between the alternating peaks and valleys of core sheet 63 give the core sheet asymmetrical properties or characteristics after and during forming. For example, a length shrinkage factor fs, which is the initial core sheet length versus the formed end sheet length, is at least 1.08, and more preferably at least 1.10 in the roll direction L, as compared to a shrinkage factor fs of approximately 1.0 in the cross-roll/cross-feeding direction W. Furthermore, an out-of-plane shear stiffness of core sheet 63 is at least 1.3 times greater, and more preferably at least 1.4 times greater in the cross-roll/cross-feeding direction W, as compared to the roll/feeding direction L:

$$[L]\text{-}G_{WT}/G_{LT} \geq 1.3$$

Additionally, an out-of-plane shear strength of core sheet 63 is at least 1.05 times greater, and more preferably at least 1.1 times greater in the cross-roll/cross-feeding direction W, as compared to the roll/feeding direction L:

$$[L]\text{-}\tau_{WT}/\tau_{LT} \geq 1.05$$

In other words, the formed core sheet 63 can be torqued or flexed about an axis parallel to direction W considerably easily than in the perpendicular direction about an axis parallel to direction L due to the ridge and depression orientation and positioning. It should be appreciated that the core sheet thickness will vary after it is embossed. This asymmetrical core formation is very different than the symmetry desired in various prior constructions.

The compressive strength of the present sandwich structure 43 is maximized where the outer sheets are bonded to the core sheet, across the cross-sectional thickness (as viewed in FIG. 3). The relative density of this particular sandwich core layer can be calculated as followed:

$$\rho^* = \frac{f_s \cdot t_c}{C}$$

where $t_c$ is the initial sheet thickness of the core layer, C denotes the core layer height and $f_s$ is the shrinkage factor in the length direction L. Thus, the asymmetrical nature of the periodic array of peak and valley cells or dimples, as connected in one direction by raised ridges and separated in the other by steep depressed areas, advantageously provides for different directional forming and final product properties and characteristics. It is preferred that the open space between the sheets, including versions with multiple core sheets, not define a honeycomb pattern, since such a pattern exhibits differing performance and manufacturing characteristics. Adhesive 76 is the sole fastener between the lands 67 of core sheet 63 and the adjacent interior surfaces of sheets 61 and 65 in the presently preferred construction, although brazing may be alternately employed.

FIGS. 2 and 6 illustrate a depression 81 in inner face sheet 61 between spaced apart sections of core sheet 63. Backsides of face sheets 61 and 65 are bonded together by adhesive 83 therebetween. Each track 47 is affixed in its associated depression 81 solely by adhesive 85. Tracks 47 are preferably stamped or extruded from aluminum or steel metallic material. Each track is generally C-shaped in cross-section and includes inwardly facing rims 87 separated by a single elongated opening or spaced apart slots or apertures 89 providing access to an enlarged and undercut, hollow cavity 90. A backside or base 91 of each track 47 is coupled to rims 87 by side walls 93 that outwardly taper toward inner face sheet 61 at an angle α of preferably 30-90°. The accessible inboard surfaces of rims 87 are essentially flush with the adjacent exposed interior surface 95 of outer sheet 61. Depression 81 is stamped, roll formed or embossed into inner face sheet 61 in an elongated manner essentially between opposite peripheral edges thereof. Track 87 is also elongated essentially the full height or lateral dimension of outer sheet 61 (as shown in FIG. 5). It is noteworthy that tracks 87 are mounted to only an interior and cargo-accessible surface of inner face sheet 61 rather than between the face sheets.

Referring to FIG. 6, overhanging peripheral lips 103 of face sheets 61 and 65 laterally project beyond terminal ends 105 of core sheet 63 and the opposite face sheet. For example, lip 103a of face sheet 61 provides an overlapping mating interface against outer sheet 61 of adjacent sandwich structure 43 with adhesive 105 therebetween. The opposite lip 103b of outer face sheet 65 provides an overlapping mating interface against outer sheet 65 of adjacent structure 43, with adhesive 105 therebetween. This achieves a ship-lap seam construction that resists rain water entry and is ideally suited for roof and sidewall use. Traditional trailer roofs are made of a large single steel sheet to minimize water entry through seams or rivet holes otherwise present if multiple sheets were fastened together. The present ship-lap sandwich, however, allows for use of multiple fastened sheets, in a water-tight manner, which is much easier for assembly and repair.

Either a small gap, sealing caulk, or adhesive 107 can be located between the adjacent terminal ends at panel seams 48. This ship-lap construction achieves a large interfacing adhesive surface area extending the full height or lateral dimension of the side wall without rivet holes. One exemplary adhesive at the ship-lap seams is a two component methacrylate which can be room temperature cured. Preferably, no separate mechanical fasteners to the lips or tracks are required, however, rivets or screws can be employed especially if replacement or repair is required, although some benefits may not be achieved with use of these supplemental mechanical fasteners.

In the configuration of FIGS. 7 and 8, face sheet 65a has a peripheral edge formed or bent into a perpendicularly offset L-shaped flange 101a which abuts against an offset flange 101*b* similarly turned or bent from inner face sheet 61*b*. A structural and sealing caulk or adhesive may optionally be applied where the edge of each bent flange 101 contacts against the corresponding opposite face sheet 61 or 65. Face sheets 61*a* and 65*b* also include peripherally extending flat lips 103*a* and 103*b* which overlap and are adhesively bonded to face sheets 61*b* and 65*a*, respectively, in a ship-lap manner. Thus, during the manufacturing, the core sheet is cut short of the peripheral edge at lips 103 and flanges 101 of the adjacent outer face sheets. Flanges are bent by stamping, rolling or embossing. The ship-lap lips and bent flanges advantageously provide a dual water seal protection to keep water from entering the sandwich panels and to keep out water from the interior of the container, especially for roofs.

The present apparatus is ideally suited for a modularized wall, roof or floor construction in the container since tracks 47 can optionally be preassembled to sandwich structures 43 which allows for preassembled strength versus weight optimized tailoring and fast final assembly with minimal extra parts. The present apparatus can also be used in combination with one or more of the features of PCT Patent Publication No. WO 2015/148707 entitled "Container Apparatus Including Sandwich Structure," co-invented by the present inventors, and incorporated by reference herein.

While various embodiments of the present invention have been disclosed, it should also be appreciated that other variations may be employed. For example, other dimensions and shapes may be provided for the core sheet and tracks, however, many of the manufacturing advantages and property strengths will not be achieved. It should also be appreciated that any of the preceding embodiments and features thereof can be mixed and matched with any of the others depending upon the final product and processing characteristics desired. Variations are not to be regarded as a departure from the present disclosure, and all such modifications are intended to be included within the scope and spirit of the present invention.

The invention claimed is:

1. A container apparatus comprising:
   a first sandwich structure including at least one metallic core sheet sandwiched between face sheets, the core sheet including alternating peaks and valleys;
   at least a second sandwich structure including at least one metallic core sheet sandwiched between face sheets, the core sheet including alternating peaks and valleys; and
   in the first sandwich structure, at least one of the face sheets including a lip laterally extending past terminal ends of the core sheet and the opposite face sheet, the lip providing an attaching surface to the adjacent second sandwich structure.

2. The apparatus of claim 1, wherein the opposite face sheet includes a substantially perpendicularly bent flange the edge of which is pointing toward and adjacent the lip.

3. The apparatus of claim 1, being a wheeled box trailer, wherein the sheets are metallic and the lip is solely adhesively bonded to the adjacent face sheet of the second sandwich structure.

4. The apparatus of claim 1, being an intermodal shipping container, wherein the sheets are metallic and the lip is solely adhesively bonded to the adjacent face sheet of the second sandwich structure.

5. The apparatus of claim 1, being a railroad car, wherein the sheets are metallic and the lip is solely adhesively bonded to the adjacent face sheet of the second sandwich structure.

6. The apparatus of claim 1, further comprising only adhesive fastening together the sheets within the sandwich structures and the sandwich structures to each other.

7. The apparatus of claim 1, further comprising at least one elongated depression in at least one of the face sheets, the core sheet being absent at the depression.

\* \* \* \* \*